United States Patent [19]

Sai

[11] Patent Number: 4,607,162
[45] Date of Patent: Aug. 19, 1986

[54] SENSING APPARATUS FOR MEASURING A PHYSICAL QUANTITY

[75] Inventor: Yukio Sai, Fuchu, Japan

[73] Assignee: Tokyo Shibaura Denki Kabushiki Kaisha, Kawasaki, Japan

[21] Appl. No.: 531,086

[22] Filed: Sep. 12, 1983

[30] Foreign Application Priority Data

Sep. 30, 1982 [JP] Japan ................................ 57-171710

[51] Int. Cl.$^4$ ........................... H01J 5/16; H01J 3/14; H01J 40/14
[52] U.S. Cl. ................................... 250/227; 250/237 R
[58] Field of Search ............... 250/231 R, 237 G, 227; 350/96.19, 96.15, 96.13

[56] References Cited

U.S. PATENT DOCUMENTS

| | | | |
|---|---|---|---|
| 3,483,389 | 12/1969 | Cronin | 250/231 R |
| 3,598,999 | 8/1971 | Hofmeister | 250/231 R |
| 4,223,216 | 9/1980 | Quick et al. | 250/231 R |
| 4,403,144 | 9/1983 | Strahan et al. | 250/237 G |
| 4,427,881 | 1/1984 | Ruell | 250/231 R |
| 4,471,219 | 9/1984 | Giallorenzi | 250/231 R |

*Primary Examiner*—David C. Nelms
*Assistant Examiner*—Stephone B. Allen
*Attorney, Agent, or Firm*—Banner, Birch, McKie & Beckett

[57] ABSTRACT

According to the instant invention, two input light transmitting lines or paths are used which transmit the wavelength input light of the same wavelength. A detecting portion modulates the two inputs according to the physical quantity to be measured and produces separate outputs along two output transmitting paths. A processing portion processes the two outputs and calculates the physical quantity to be measured.

In the detecting portion, each of the inputs is split into two separate light signals each of which varies at a different rate due to the effects of the physical quantity. The two separated light signals follow a respective output transmitting paths. As a result, two output signals are produced along the output paths for each input light applied to the detecting portion. The processing portion calculates one intensity ratio corresponding to the ratio of the two output signals when one input light is supplied, and calculates another intensity ratio corresponding to the ratio of two output signals when the other input light is supplied. These intensity ratios are multiplied and the physical quantity is then calculated based on the resulting multiplied value.

6 Claims, 15 Drawing Figures

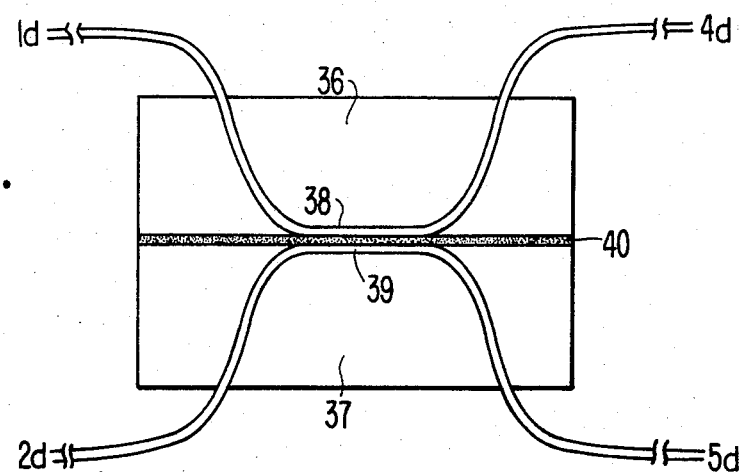
FIG. 5(a).
FIG. 5(b).
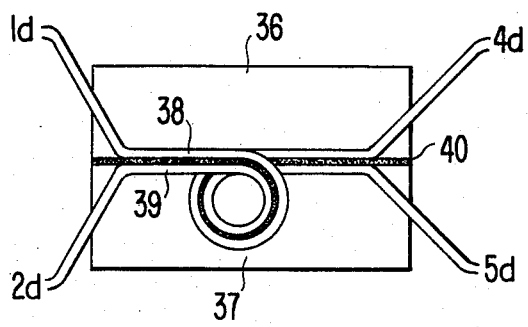
FIG. 5(c).
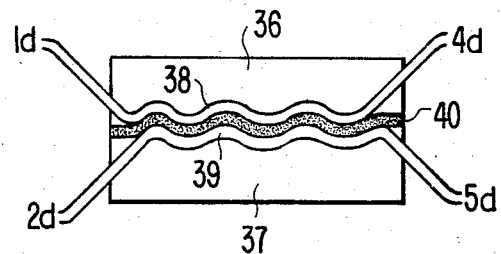
FIG. 6.
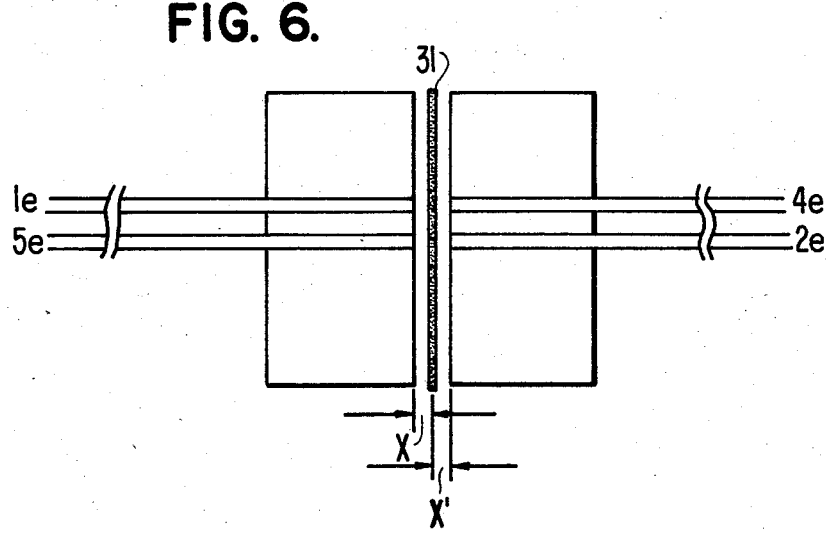

SENSING APPARATUS FOR MEASURING A PHYSICAL QUANTITY

BACKGROUND OF THE INVENTION

This invention relates to a sensing apparatus for detecting and measuring a physical quantity by utilizing light and photodetectors.

A measurement system utilizing light is preferable for measuring physical quantities since a large amount of information can be transmitted by light and is not easily subject to distortion. Measurement systems utilizing sources other than light (e.g., electricity) can be easily affect by various factors such as magnetic induction or grounding abnormalities.

Various types of sensors have been proposed for use in a measurement system incorporating optical fibers as a transmission line. It is important that signal variation or signal loss along the optical fiber transmission path and light source variations do not substantially affect the detected output signal.

For this purpose, two conventional methods have been used. One method utilizes a common light source for two different transmission paths. The first path senses the physical quantity within a detecting area while the second path is not affected by the physical quantity. The outputs of both paths are then compared to measure the physical quantity.

Another method utilizes two sources having a common path. Moreover, both paths extend through the detecting area for detecting the physical quantity. The sources produce a light having two different wavelengths; thus, two detecting signals are produced whose ratio can be used to calculate the physical quantity. That is, since the variation of the physical quantity is known separately for each wavelength, a graph can be drawn of the variation of the physical quantity versus the ratio of the two wavelengths. Upon measuring the ratio by the second method, the physical quantity can be determined from the graph.

These conventional methods, however, have certain disadvantages. While the first method corrects for variations in source intensity and changes in the ambient condition by cancelling the disturbances along both paths, other disturbances are not compensated. For example, in the first method, the first path through the transducer portion (i.e., detecting area) has a different characteristic caused by the physical quantity. Thus, both paths do not always receive an equal disturbance caused by the physical quantity. Therefore, the effect of a disturbances is not completely compensated.

In the latter method, the disturbance caused by the physical quantity will be compensated. However, the use of different wavelengths will cause different intensities produced at the source; further, the characteristics of the transmission path will vary from wavelength to wavelength. As a result, the accuracy of the measurement system will be adversely affected. Even if the effect of the disturbances can be minimally suppressed, it is necessary to keep the output intensity ratio of the two sources constant or to monitor these respective output intensities. In that event, it is necessary to use expensive and sensitive optical equipment, such as light separators or light multiplexors. As a result, the reliability of the system will be decreased while the system cost will be adversely increased.

SUMMARY OF THE INVENTION

It is an object of the invention to provide a optical sensor which utilizes a light source having a single wavelength.

It is another object of the invention to provide a optical sensor in which signal variations or signal loss along the optical transmission path or light source intensity variations will not substantially affect the detected output signal.

According to the instant invention, two input light transmitting lines or paths are used which transmit the wavelength input light of the same wavelength. A detecting portion modulates the two inputs according to the physical quantity to be measured and produces separate outputs along two output transmitting paths. A processing portion processes the two outputs and calculates the physical quantity to be measured.

In the detecting portion, each of the inputs is split into two separate light signals each of which varies at a different rate due to the effects of the physical quantity. The two separated light signals follow respective output transmitting paths. As a result, two output signals are produced along the output paths for each input light applied to the detecting portion. The processing portion calculates one intensity ratio corresponding to the ratio of the two output signals when one input light is supplied, and calculates another intensity ratio corresponding to the ratio of two output signals when the other input light is supplied. These intensity ratios are multiplied and the physical quantity is then calculated based on the resulting multiplied value.

BRIEF DESCRIPTION OF THE DRAWINGS

FIGS. 3, 4, 5a, 5b, 5(c) and 6 are schematic diagrams of other embodiments of the detecting portion.

DESCRIPTION OF THE PREFERRED EMBODIMENTS

Figure 1:
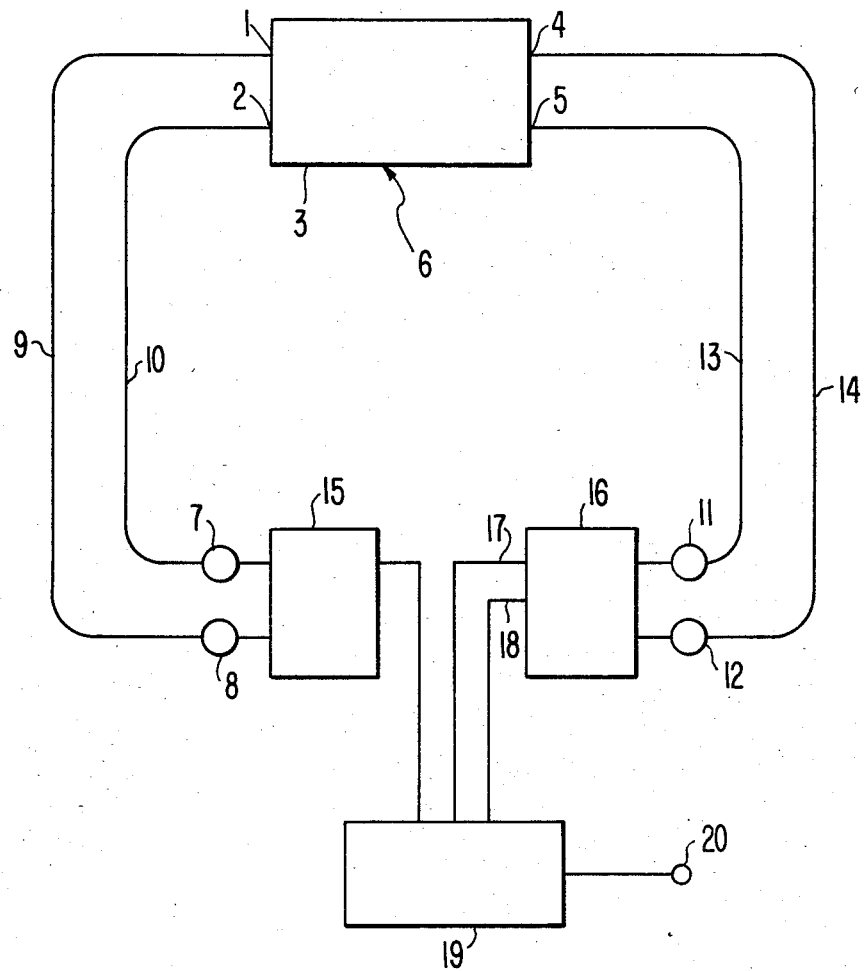
FIG. 1 is a block diagram of the sensing apparatus according to the invention.

Referring now to the drawing, embodiments of the invention are explained. In FIG. 1, a detecting portion or area 3 has two separate inputs 1, 2 for receiving input light signals and two outputs 4, 5 for delivering output light signals.

In the detecting portion, each of the received light is split into two separate light signals which have different paths of travel. One split signal is projected to one output, while the second split signal is projected to the other output. The intensity of these two separated signals vary at a rate depending upon the influence of the physical quantity to be measured. Accordingly, the input light supplied to inputs 1, 2 are respectively modulated by the physical quantity being measured and are supplied to outputs 4, 5.

A driving circuit 15 drives light sources 7, 8 which radiates input light having the same wavelength. Input light transmitting lines or paths 9, 10 transmit the light radiated from sources 7, 8 to inputs 1, 2 respectively. Lines 9 and 10 can consist of optical fiber for transmitting the input light. Photo detectors 11, 12 detect the output light signals which are supplied from outputs 4, 5 and transmitted via output light transmitting lines or paths 13, 14.

Detectors 11, 12 convert the light signals to electrical signals and are then supplied to a receiving circuit 16. The electric signals are amplified by receiving circuit 16 and are then transmitted via wires 17, 18 to a processing circuit 19. Circuit 19 processes the signals and calculates the physical quantity; the resulting output is supplied from output terminal 20. Processing circuit 19 also controls driving circuit 15 so that sources 7, 8 are synchronized with the processing undertaken by circuit 19.

By this design, the physical quantity is measured by detecting the change in the transmission rate along the separate paths within the detecting area. In addition, since a single wavelength is used, the intensity levels supplied as an input and the characteristics of the transmission paths will not substantially vary with respect to each other. Further, since both inputs are supplied to the detecting area 3, rather than a single input, the physical quantity will affect both paths in a similar manner and amount. As a result, an output sensor is provided in which signal variations or signal loss along the transmission path or variations in the light source will not substantially affect the detected signal. As a result, any external disturbances which would otherwise adversely affect the measurement of the physical quantity are cancelled.

In explaining how the optical sensor of the invention cancels the effects caused by the external disturbances, the following discussions is used:

$P_1$: light output of light source 7;
$P_2$: light output of light source 8;
$K_1$: transmitting rate of light transmitting path 10 and connection to input 2 and source 7;
$K_2$: transmitting rate of light transmitting path 9 and connection to input 11 and source 8;
$K_3$: transmitting rate of light transmitting path 13 and connection to output 5 and detector 11;
$K_4$: transmitting rate of light transmitting path 14 and connection to output 4 and detector 12;
$L_1$: efficiency of converting from a light signal to an electrical signal in photo detector 11;
$L_2$: efficiency of converting from a light signal to an electrical signal in photo detector 12;
$X$: physical quantity to be measured;
$M_{14}(x)$: transmitting rate of light, affected by the physical quantity to be measured, from input 1 through a direct path to output 4 within the detecting portion (i.e., direct transmitting rate);
$M_{15}(x)$: transmitting rate of light, affected by the physical quantity to be measured, from input 1 through a split path to output 5 within the detecting portion (i.e., mutual transmitting rate);
$M_{24}(x)$: transmitting rate of light, affected by the physical quantity to be measured, from input 2 through an split path to output 4 within the detecting portion (i.e., mutual transmitting rate);
$M_{25}(x)$: transmitting rate of light, affected by the physical quantity to be measured, from input 2 through a direct path to output 5 within the detecting portion (i.e., direct transmitting rate);

$S_{7\text{-}11}$: electrical output signal intensity of detector 11 caused by light source 7;
$S_{7\text{-}12}$: electrical output signal intensity of detector 12 caused by light source 7;
$S_{8\text{-}11}$: electrical output signal intensity of detector 11 caused by light source 8;
$S_{8\text{-}12}$: electrical output signal of intensity detector 12 caused by light source 8;

Electric output signals $S_{7\text{-}11}$, $S_{7\text{-}12}$, $S_{8\text{-}11}$, $S_{8\text{-}12}$ can be represented by the following equations:

$$S_{7\text{-}11} = P_1 \cdot K_1 \cdot M_{25} \cdot K_3 \cdot L_1 \tag{1}$$

$$S_{7\text{-}12} = P_1 \cdot K_1 \cdot M_{24} \cdot K_4 \cdot L_2 \tag{2}$$

$$S_{8\text{-}11} = P_2 \cdot K_2 \cdot M_{15} \cdot K_3 \cdot L_1 \tag{3}$$

$$S_{8\text{-}12} = P_2 \cdot K_2 \cdot M_{14} \cdot K_4 \cdot L_2 \tag{4}$$

Processor 19, at first stores the values of $S_{7\text{-}11}$, $S_{7\text{-}12}$, $S_{8\text{-}11}$ and $S_{8\text{-}12}$ and then calculates the following expression (5):

$$(S_{7\text{-}11} \cdot S_{8\text{-}12})/(S_{7\text{-}12} \cdot S_{8\text{-}11}) \tag{5}$$

Substituting the equations (1)–(4) in expression (5) yields the following exposures (6):

$$(S_{7\text{-}11} \cdot S_{8\text{-}12})/(S_{7\text{-}12} \cdot S_{8\text{-}11}) = (M_{25} \cdot M_{14})/(M_{24} \cdot M_{15}) \tag{6}$$

As seen from expression (6), the characteristics of light sources 7, 8 or the losses due to transmitting lines 9, 10, 13, 14 are not factors which can influence the measured value. Rather, the expression only includes the change in transmitting rate within the detecting portion 3 caused by the physical quantity to be measured. Thus, losses due to signal variation, signal loss along the transmission path, losses due to light source variations, and losses due to connecting points and converting efficiency of the detectors are all compensated.

Accordingly, if the relationship between expression (5) and the physical quantity to be measured is determined in advance, the physical quantity to be measured can be obtained from expression (5) by using the output signal values of detectors 11, 12. That is, source 7 is first activated to obtain values for $S_{7\text{-}11}$ and $S_{2\text{-}12}$; then source 8 is activated to obtain values for $S_{8\text{-}11}$ and $S_{8\text{-}12}$. Substituting these values in expression (6) will give the ratio value of expression (5).

Figure 2A:
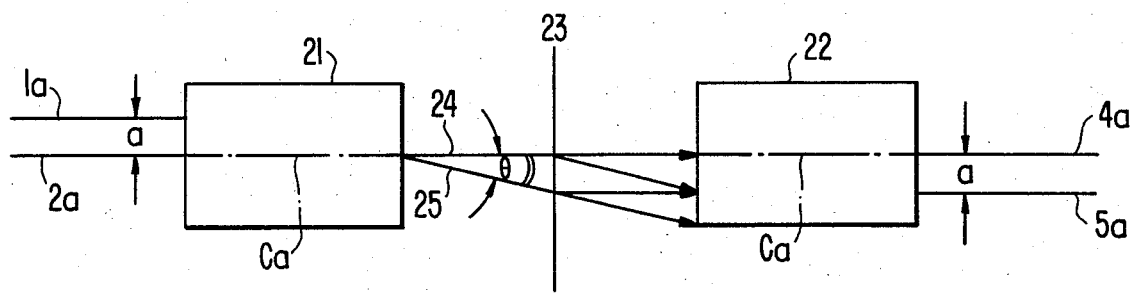
FIG. 2(a) is a schematic diagram of an embodiment of the detecting portion utilized in FIG. 1.

One embodiment of detecting portion 3 will now be explained with reference to FIG. 2(*a*). As will be shown, detector 3 converts input signal 1*a* to a plurality of output signals at 4*a* and 5*a*; input 2*a* is connected to a plurality of output signals at 4*a* and 5*a*. In this case, detecting portion 3 comprises self-focusing rod lenses 21, 22 and diffraction grating element 23. The central optical axes of lenses 21 and 22 are on the same central axis Ca. Input light 1*a*, 2*a* supplied to lens 21, and output light 4*a* and 5*a* are supplied from lens 22. Input light 2*a* is supplied to the center of lens 21. Input light 1*a* is supplied to a position off center of lens 21 by a predetermined distance a. Output light 4*a* is supplied from the center of lens 22, while output light 5*a* is supplied off center of lens 22 by the same distance a from central axis Ca.

In self-focusing rod lens 21, light 2*a* is translated to a beam 24 which is parallel to optical axis Ca; and beam 24 is then supplied to element 23, while light 1*a* is translated to a beam 25 having angle $\theta$ which is proportional to the distance a. The pitch of diffraction grating 23 is set so that the diffraction angle of the first diffraction light is $\theta$. Beam 24 is split by element 23 to a first diffracted beam parallel to optical axis Ca and a second diffracted light beam having angle $\theta$ with respect to beam 24; the first and second diffracted beams are then translated to output beams 4a and 5a respectively. In a similar manner, beam 25 having angle $\theta$ is split by element 23 to a thus diffracted beam having an angle $\theta$ with axis Ca and a fourth diffracted light beam parallel to optical axis Ca; the third and fourth diffracted beams are then translated to output beams 5a and 4a, respectively.

Figure 2B:
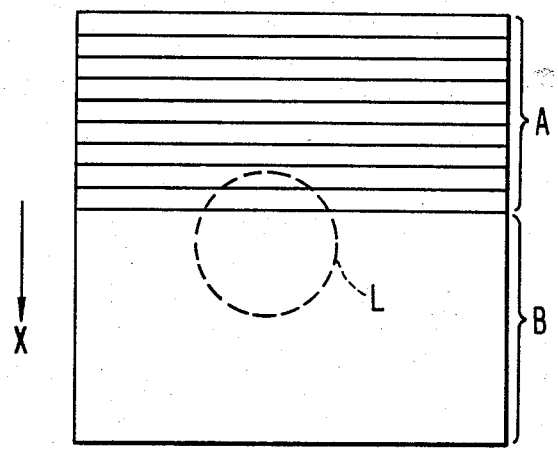
FIG. 2(b) is a schematic diagram of a diffraction grating element of the embodiment shown in FIG. 2(a).
Figure 8:
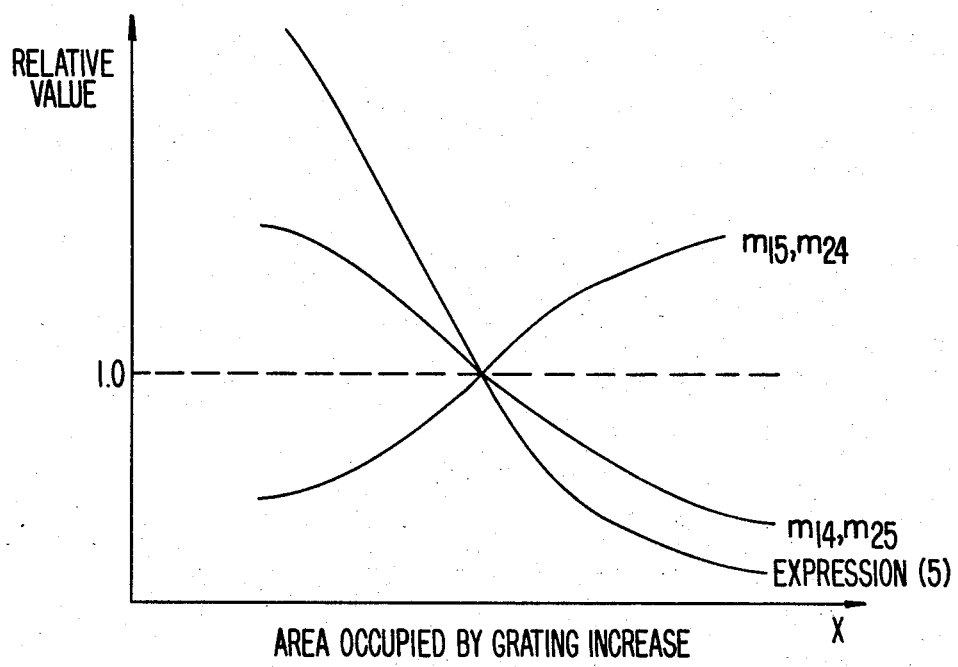

If element 23 has characteristics such that the efficiency of diffraction varies as a function of the physical quality to be measured, element 23 can be used to measure the physical quantity. As shown in FIG. 2(b), for example, if element 23 has a grating area A and a transparent area B, the efficiency of diffraction varies in proportion to the area of beam L which projects out grating area A. That is, the efficiency will be a function of the displacement x. In the case that a standard self-focusing rod lenses is used, the diameter of the light beam will be approximately 1 mm; thus, displacements within 1 mm can be measured with high sensitivity. In that case, the relationship between displacement x and values $M_{15}$, $M_{24}$, $M_{14}$, $M_{25}$ and expression (5) is shown in FIG. 8.

Figure 9:
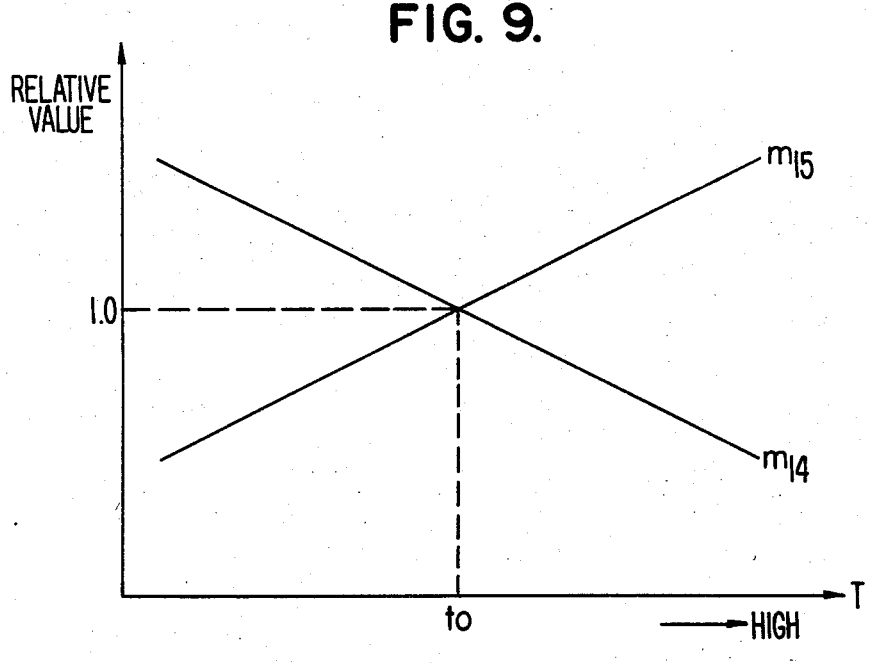

A temperature sensor can be made according to the invention, if element 23 is a diffraction grating made of semiconductor material such as $G_aA_s$ or an amorphous material whose transmissivity varies as a function of temperature. A material whose refractive index varies due to the temperature such as $L_iN_bO_3$ can be used instead of a material whose transmissivity varies due to temperature. In this case, the relationship between temperature T and the values $M_{14}$, $M_{15}$ is shown in FIG. 9.

Figure 10:
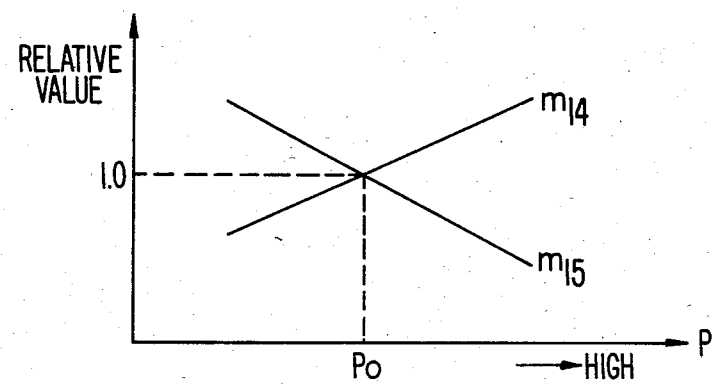
FIGS. 8, 9, 10, 11 and 12 are diagrams for various detecting portion constructions which explain the relationship between the physical quantity to be measured and the transmitting rate values (e.g., M14, M15).

A pressure sensor can be made according to the invention, if element 23 is a diffraction grating comprising an optical material whose transmissivity or refractive index varies as a function of variations in pressure such as $G_aA_s$, $C_dT_e$. In this case, the relationship between pressure P and the values $M_{14}$, $M_{15}$ is shown in FIG. 10.

Figure 3:
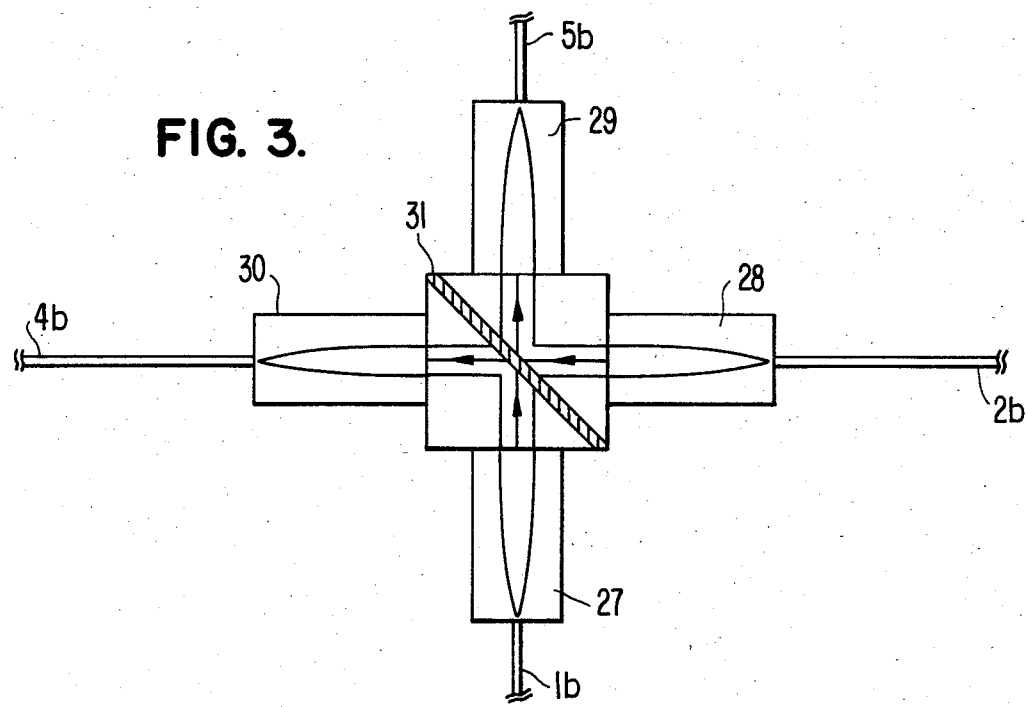

Shown in FIG. 3 is another embodiment of a detecting portion 3. In this case, a physical quantity, for example variations in temperature, is detected by using both the transmissivity and the reflectivity. Detecting portion 3 comprises self-focusing rod lenses 27, 28, 29, 30 and half-mirror 31. Two lenses 27 and 28 receive input light 1b and 2b respectively and two lenses 29 and 30 supply output light 5b and 4b respectively. Half-mirror 31 is made of a semiconductor material such a $G_aA_s$ whose transmissivity varies as a function of temperature. Lens 27 transforms input light 1b into two parallel beams which irradiate half-mirror 31. The light transmitted through half-mirror 31 becomes output light 5b via lens 29. The light reflected by half-mirror 31 becomes output light 4b via lens 30. In a similar manner, output light 4b and 5b are obtained from input light 2b.

Figure 4:
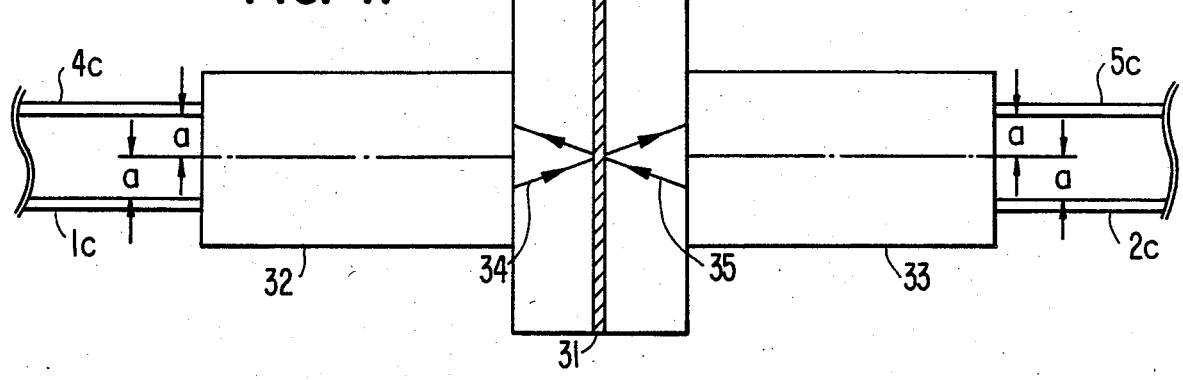

Another embodiment for detecting portion 3 is shown in FIG. 4. In this embodiment, detecting portion 3 comprises two self-focusing lenses 32, 33 and half-mirror 31. In this case, one lens functions as two lenses shown in FIG. 3. Transmitting paths for input lights 1(c), 2(c) and output light 4c, 5c are connected to inputs and outputs, respectively, which are spaced from the center of lenses 32, 33 by an equal distance a. According to the nature of the self-focusing rod lens, the input light 1c produces a beam whose direction is shown by arrow 34 which irradiates half-mirror 31. The light transmitted through half-mirror 31 becomes output light 5c and the light reflected by half-mirror 31 becomes output light 4c. In similar manner, input light 2c produces a beam whose direction is shown by arrow 35 and produces output light 4c and 5c.

Figure 11:
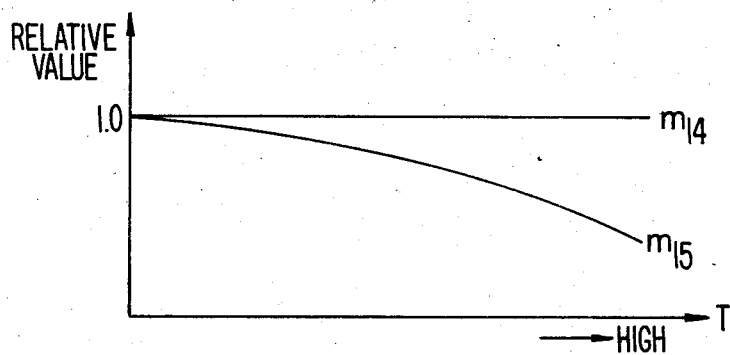

The detecting portion shown in FIG. 4 is more compact than that shown in FIG. 3. However, it is important with the design of FIG. 4 that distance a from the fiber connecting points to the lens center must be accurately made. If half-mirror 31 is made of $G_aA_s$ for the designs of FIG. 3 or FIG. 4, the relationship between temperature and the values $M_{15}$, $M_{14}$ is shown in FIG. 11.

Figure 12:
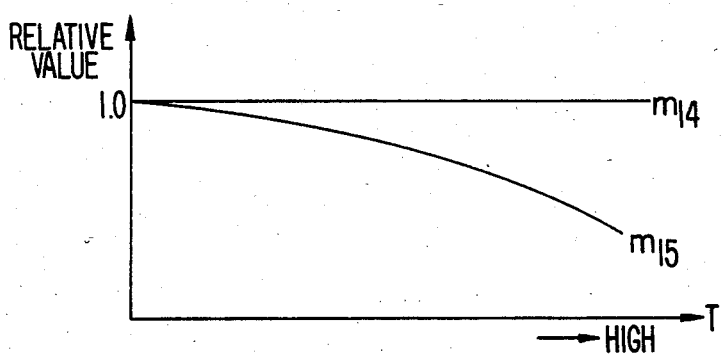

A further embodiment of detecting portion 3 is shown in FIG. 5(a). In this case, the path of input light 1d and the path of output light 4d are connected by one light transmitting line 38 supported by supporting member 36. The path of input light 2d and the path of output light 5d are connected by one light transmitting line 39 supported by supporting member 37. A middle portion of paths 38 and 39 extend toward each other and are adjacently positioned on either side of a boundary layer 40. At this middle portion, the clad of the lines are stupped off and core is exposed so that the light can leak to the other line. If the characteristics of boundary layer 40 varies due to the physical quantity to be measured, the coupling rate will vary and the output light 4d or 5d will accordingly vary. If the optical characteristic of the material of boundary layer varies due to temperature or pressure, a temperature sensor or pressure sensor can be obtained according to the invention. For example, the material of boundary layer 40 can comprise a semiconductor crystal such as $G_aA_s$ crystal or an amorphous material whose transmissivity varies due to the temperature, or can be a liquid crystal whose refractive index varies due to temperature or pressure. In the case that boundary layer is made of $G_aA_s$ or $C_dT_e$, the relationship between temperature T and values $M_{14}$, $M_{15}$ is shown in FIG. 12. Further, the shape of the middle coupling portion can be modified such as the microbending shown in FIG. 5(b) or a periodic waveform as shown in FIG. 5(c).

Further, instead of varying the optical characteristics of the boundary layer material, the variation in shape of the boundary layer can affect the coupling rate. For example, boundary layer 40 can be made of an elastic body which has a variation in thickness due to pressure changes. Further, coupling rate can change due to variation in coupling width. That is, if supporting members 36, 37 move with respect to each other, the length of the contact surface of the fibers will change and thereby change the coupling rate. In these cases, therefore, pressure, displacement or vibration can be measured.

Figure 7:
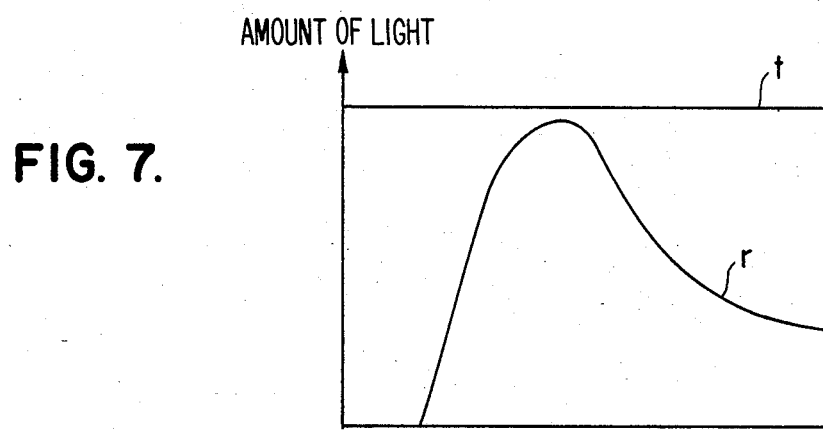
FIG. 7 is a diagram showing the relationship between the distance x (i.e., the distance between the fiber edges and the half-mirror) and the light intensity of the embodiment shown in FIG. 6.

A still further embodiment of detecting portion 3 is shown in FIG. 6. In this embodiment, there are no self-focusing rod lenses similar to those shown in FIG. 4, In this case, two pairs of light transmitting lines 1e, 5e, 2e, 4e are positioned facing half-mirror 31; mirror 31 has a transmissivity which varies according to temperature. Transmitting lines 1e, 5e, 2e, 4e are made of quartz optical fiber whose diameter, for example, is 125 $\mu$m. Fibers 1e, 5e and fibers 2e, 4e can be spaced from each other by 100 $\mu$m or can directly contact each other. The distance x between the edges of fibers 1e, 5e and half-mirror 31 and the distance x' between the edges of fibers 2e, 4e and half-mirror 31 are approximately 10–70 $\mu$m. The light 1e transmitted through half-mirror 31 becomes light 4e and the light reflected by half-mirror 31 becomes light 5e. In a similar manner, the transmitted and reflected light of light 2e becomes light 5e and 4e, respectively. In this embodiment, the amount of the reflected light varies according to the distance x or x'. The relationship between the amount of transmitted light t and reflected light r and the distant x is shown in FIG. 7. In this case, the difference in pressure of both sides of half-mirror 31 can be measured due to the variation in distance x.

I claim:

1. A sensing apparatus for measuring a physical quantity with a detecting area comprising:

means for producing a first input light signal and a second input light signal, each of said signals having the same wavelength;

a first transmitting means and a second transmitting means for separately transmitting said first input light signal and said second input light signal, respectively to a detector means for detecting the physical quantity with said detecting area;

said detector means having converting means for converting said first input light signal to a first output light signal and a second output light signal and for converting said second input light signal to a third output light signal and a fourth output light signal, each output light signal having a transmission path through said detecting area where said output light signals are affected by the physical quantity;

measuring means coupled to said detector means for receiving each of said output light signals and measuring said physical quantity;

third transmitting means for transmitting said first output light signal and said fourth output light to said measuring means; and fourth transmitting means for transmitting said second output light signal and third output light signal to said measuring means;

said measuring means measuring said physical quantity as a function of the ratio of said first output light signal to said second output light signal and the ratio of said third output light signal to said fourth output light signal.

2. A sensing apparatus according to claim 1, wherein the converting means includes a diffraction grating element having an efficiency of diffraction which varies as a function of the physical quantity being measured.

3. A sensing apparatus according to claim 1, wherein the converting means includes a light splitting element whose transmissivity or reflective index varies as a function of the physical quantity being measured.

4. A sensing apparatus according to claim 1, wherein the converting means includes two adjacent light transmitting lines optically coupled to each other, said converting means including means for varying the coupling of light between said adjacent transmitting lines as a function of the physical quantity to be measured.

5. A method for measuring a physical quantity within a detecting area comprising the steps of:

producing a first input light signal and a second input light signal, each of said signals having the same wavelength;

separately transmitting said first input light signal and said second input light signal to a detector means for detecting the physical quantity within said detecting area;

converting said first input light signal to a first output light signal and a second output light signal and converting said second input light signal to a third output light signal and a fourth output light signal each output light signal having a transmission path through said detecting area where said output signals are affected by the physical quantity;

transmitting said first output light signal and said fourth output signal to a measuring means;

transmitting said second output light signal and said third output light signal to said measuring means; and measuring said physical quantity as a function of the ratio of said first output light signal to said second output light signal and the ratio of said third output light signal to said fourth output light signal.

6. The method of claim 5 wherein the step of measuring comprises the steps of:

measuring the ratio of said first output light signal to said second output light signal;

measuring the ratio of said third output light signal to said fourth output light signal; and multiplying the measured ratios.

* * * * *